May 17, 1955     M. M. TRIPLETT     2,708,609
SHOCK MOUNTING JEWEL BEARING IN ELECTRICAL INSTRUMENTS
Filed Jan. 14, 1952
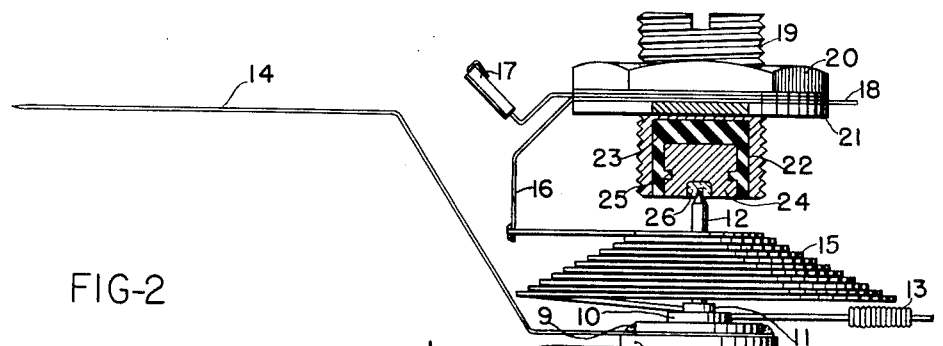
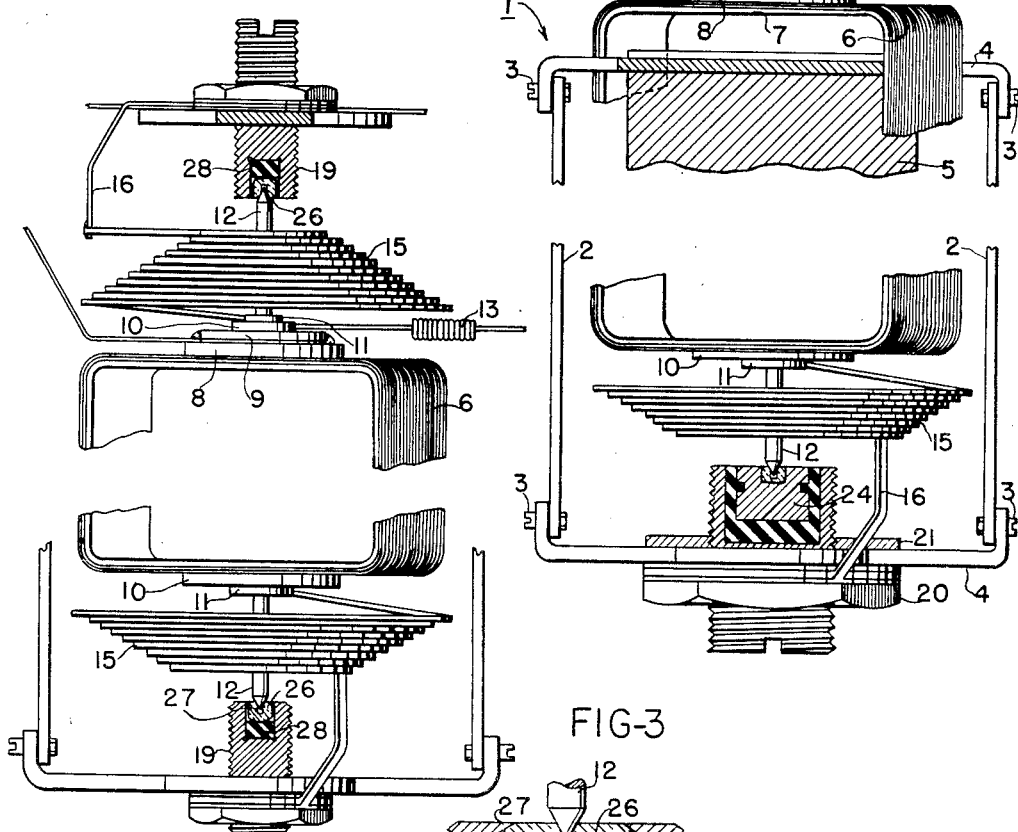
INVENTOR
MILO M. TRIPLETT
BY Toulmin & Toulmin
ATTORNEYS

United States Patent Office 2,708,609
Patented May 17, 1955

2,708,609

SHOCK MOUNTING JEWEL BEARING IN ELECTRICAL INSTRUMENTS

Milo M. Triplett, Bluffton, Ohio, assignor to The Triplett Electrical Instrument Company, Bluffton, Ohio, a corporation of Ohio Application January 14, 1952, Serial No. 266,375

2 Claims. (Cl. 308—159)

The present invention relates to electrical measuring instruments and more particularly to the structure for mounting the instrument movement. Instruments of this general character, and of a rugged nature, are often subjected to an abnormal amount of mechanical abuse such as vibration, high-shock bouncing and the like, so that the jewel bearing and the cooperating pointed shaft are often subjected to damage or change of shape which becomes a source of undue friction and thereby introduces error into the readings of the instrument if, indeed, the instrument as a whole is not rendered inoperative.

The invention is concerned with a simple but unique device or arrangement by which the pivot bearing is protected from harm either during the normal operation of the instrument or when the latter is subjected to unusual mechanical disturbances brought about by vibration, shock or rough handling, or the like.

The primary object of the invention is to provide an improved electrical measuring instrument of the double jewel bearing type in which the movement is suspended or supported between the bearings and the latter are so constructed as to withstand considerable abuse without introducing undue friction into the sensitive instrument or without causing any parts to require replacement.

Another object is to provide an electrical measuring instrument that will have a relatively long operating life, particularly from the standpoint of the bearing for the movement.

The above objects are carried out in brief by resiliently mounting the jewel bearing within the jewel screw in such a way that freedom of movement is permitted the bearing in a number of different directions, thereby absorbing shock and vibration, and yet highly accurate alignment is attained between the stub shafts carrying the movement to provide complete freedom of oscillatory motion.

The invention will be better understood when reference is made to the following description and the accompanying drawings, in which:

Figure 1 represents an enlarged fragmentary view, partly in perspective and partly in section, of the improved movement mounting, showing particularly the details of the jewel bearings;

Figure 2 is an enlarged modified form of the movement including the jewel bearings, showing an alternative construction for mounting the bearings or jewels within the jewel screw; and Figure 3 is a fragmentary enlarged detail view of the jewel screw and the jewel shown in Figure 2 in order to clearly illustrate the details of the jewel and the immediately surrounding structure.

Referring to Fig. 1, reference character 1 refers generally to a rectangularly shaped frame member comprising two metal upright strips 2 positioned on opposite sides of the movement and joined at each end by screws 3 to U-shaped metal bars 4 so that the latter are located at the top and the bottom of the frame. The lower bar 4 constitutes one of the bar bridges for supporting the lower jewel bearing. This frame is preferably of a non-magnetic metal, such as brass, and is supported in any suitable manner within the casing (not shown) of the instrument.

The upper member 4 and a horizontal arm (not shown) which spans the lower end of the frame members 1 support between them a stationary solid core 5 for magnetically cooperating with a swingable coil 6. The latter is usually constituted of a number of turns of wire wound about a rectangular frame 7 of rigid insulating material, this coil being journaled through discs 8, 9, 10 and 11 to stub shafts 12.

There is a counter-weight arm 13 secured in any suitable well-known manner to the disc 10 to offset the momentum and weight of the pointer 14. The latter may be secured in any well-known manner between the discs 8 and 9 so that as the coil 6 swings or oscillates, the pointer 14 will move in a corresponding manner over an indicating dial (not shown).

For making electrical connection each end of the coil 6 there is usually provided a spiral or helical spring 15 at each end, the outermost convolution of the spring being connected to the discs 11 and the inner convolution being maintained at a stationary position by means of arms 16. The discs 10 are in electrical connection with the ends of the coil 6 so that the current to be measured or indicated can be passed through the arms 16 and in that manner received by the coil 6. The torsional springs 15, which are substantially flat but do have a slightly conical configuration, serve to restore the pointer to its zero position when the current passing through the instrument is interrupted. These springs serve the dual purpose of furnishing an electrical connection to the two ends of the coil 6 without disturbing the swinging function, and in addition, mechanically bias the pointer and thus bring it back to zero when the current is stopped.

In the past the bearings for the stub shafts 12 have given some trouble in that, due to the sensitivity of the instrument and the minuteness of the parts including the swingable elements, difficulties of assembly are encountered because unless the shafts are perfectly aligned, friction and deformation of the ends of the shafts are bound to be present, which imparts inaccuracy into the indications of the instrument. Frictionless bearings such as jewels have been heretofore proposed and, while this friction is reduced to a minimum by the use of hard surfaced jewels, nevertheless the lack of rectilinearity of the shafts during assembly, or perhaps acquired by reason of a shock to the instrument, is still a problem. In accordance with the present invention, I propose to mount the jewel bearings in a flexible matrix which not only allows a certain amount of flexibilty in the direction of rotation of the coil, but also offers considerable protection of the jewel from any outside disturbances, such as vibratory impulses or shocks during shipment, or as encountered in military service.

Referring to Fig. 1, the upper bar bridge of the instrument is indicated at 18 and this bridge is provided with an opening for receiving a jewel screw 19. The latter extends both above and below the bar bridge and is held in position by means of hexagon nuts 20, 21. The lower part of the jewel screw has a recess 22 and this recess contains a cup-shaped body 23 of a resilient mass, such as rubber, Silicone rubber, or similar material. Within this body there is a small metal cylinder 24, optionally provided with an annular recess 25 which is filled with the rubbery compound 23. The latter is caused to flow or molded into the annular recess, thus anchoring the metal cylinder 24 in place.

The cylinder is provided with a countersunk opening into which the jewel 26 is pressed and peened in place. The jewel is provided with a small centering hole for receiving the tapered end of each stub shaft.

The lower bearing is similar to the upper bearing as described, except that the jewel screw is secured within the horizontal frame member 4 instead of the bar bridge element 18. It is apparent that the metal cylinders 24 and their contained jewels are resiliently held in position at the upper and lower ends of the instrument and any slight lack of rectilinearity of the shafts 12 is readily accommodated by the rubbery mass and the latter also serves to prevent external shock or vibrations from being communicated to the sensitive rotary portions of the instrument.

In Fig. 2 there is shown a modified form of my invention in which the rotary parts are the same as that shown and described in Fig. 1. But the bearing structure is somewhat different. In this case, the metal cylinder 24 of Fig. 1 is eliminated and the jewel 26 is inserted directly into the opening in the jewel screw 19. In order to insure easy access for the jewel into the screw, the opening in the latter can be made a little larger than the greatest size of the jewel and when the jewel has been inserted, the innermost surface of the jewel screw can be peened over the jewel as indicated at 27 to hold the latter in position.

A washer 28 of rubber, Silicone rubber, or any other flexible material may be inserted between the bottom of the jewel and the end of the recess in the jewel screw so that the jewel rests upon a body of resilient material. The latter also serves to make up for any lack of rectilinearity of the shafts 12, and in addition, serves to prevent any shocks communicated to the jewel screw from being transmitted to the jewel bearings.

Inasmuch as the jewel has a certain amount of play within the recess of the jewel screw and is held in the recess solely by the peening-over effect, the jewel can readily accommodate itself to the conical points of the stub shafts 12. As the remaining parts of the device shown in Fig. 2 are similar to those already described in connection with Fig. 1, it is believed that no further description of those parts is necessary.

From the foregoing it is evident that I have devised an electrical measuring instrument having shock-proof bearings for the rotor and have provided a certain amount of flexibility or adjustability at the bearing surfaces to accommodate any small misalignments of the stub shafts which may occur when the parts are being made and assembled on a quantity production basis.

It will be understood that other modifications and arrangements in structure could be made without departing from the spirit of my invention, and accordingly, I desire to comprehend such modifications and substitutions of equivalents as may be considered to come within the scope of the appended claims.

Having thus fully described my invention, what I claim as new and desire to secure by Letters Patent is:

1. A bearing for the actuating coil of an electrical measuring instrument, said bearing comprising a jewel screw, a cylindrical recess in said screw opening through one end thereof, a one-piece resilient cup-shaped matrix molded within said cylindrical recess, the open face of said matrix being substantially flush with the outer edge of said screw cylindrical recess, an annular rib around the inner surface of said cup-shaped matrix, said rib spaced inwardly from the open face of said matrix, a metallic cylinder inserted within said matrix and flush with the outer face of said matrix, an annular groove in the surface of said metallic cylinder to receive said annular rib to retain said metal cylinder within said matrix, a recess in the outer face of said metal cylinder, a jewel pressed into said metal cylinder recess, and having its outer face flush with said metal cylinder outer face, and a conical recess in said jewel to receive a pivot shaft.

2. A bearing for an actuating coil of an electrical instrument as in claim 1, and wherein said resilient matrix is snugly fitted within said cylindrical recess and surrounds the bottom and side walls of said metallic cylinder.

References Cited in the file of this patent

UNITED STATES PATENTS

| 919,171 | Hodge | Apr. 20, 1909 |
|---|---|---|
| 2,587,677 | Ammlung | Mar. 4, 1952 |

FOREIGN PATENTS

| 48,485 | Switzerland | Feb. 11, 1911 |
|---|---|---|
| 243,388 | Switzerland | Jan. 3, 1947 |
| 542,719 | Great Britain | Jan. 23, 1942 |
| 652,714 | Great Britain | May 2, 1951 |
| 653,982 | Great Britain | May 30, 1951 |
| 661,294 | Great Britain | Nov. 21, 1951 |